Sept. 7, 1948.    L. SPRARAGEN    2,449,020

POWER DRIVE

Filed June 14, 1943

INVENTOR
Louis Spraragen,
BY Johnson and Kline
ATTORNEYS

Patented Sept. 7, 1948

2,449,020

UNITED STATES PATENT OFFICE 2,449,020

POWER DRIVE

Louis Spraragen, Bridgeport, Conn., assignor to Automatic Locking Devices, Incorporated, Bridgeport, Conn., a corporation of Connecticut Application June 14, 1943, Serial No. 490,769

2 Claims. (Cl. 192—8)

1

This invention relates to power drives, and more particularly to the provision of the same with means for automatically locking the driven shaft against rotation when the application of power ceases.

An object of this invention is to provide a power drive in which the power of a motor, such as an electric motor, may be transmitted directly to a driven shaft, and yet, as soon as the motor ceases to drive the shaft, the latter becomes locked against further rotation, that is to say, it is held against movement either casual or such as might be caused by motion tending to be transmitted back to the motor through the drive.

This is accomplished by providing a brake device which is sensitive to changes in torque to the extent that when the torque developed by the motor is reduced to a predetermined value, as by stopping the motor or removal of the load or overrunning of the driven shaft, the brake is automatically applied to the driven shaft. Preferably, the brake is double-acting so that when effective it will lock the driven shaft against turning in either direction.

The drive of this invention may be advantageously employed in many different mechanisms and situations in the arts in which it is desired to lock, stop or prevent retrograde movement of a driven shaft, particularly when the driven shaft is connected to some device or instrumentality to be brought to a predetermined position by the motor and held there until again moved by the motor.

As will appear more fully below, according to the present invention, the locking and unlocking of the drive shaft is controlled entirely automatically and requires no attention on the part of the operator. Hence, the drive may be employed at places remote from or inaccessible to the operator. Further, the locking device is effective at all angular positions of the driven member and thus will hold the latter wherever it stops and not merely at predetermined places as would be the case with the use of detents or dogs.

Other features and advantages will hereinafter appear.

In the accompanying drawing which illustrates one form of this invention, that at present preferred—

2

Figure 1:
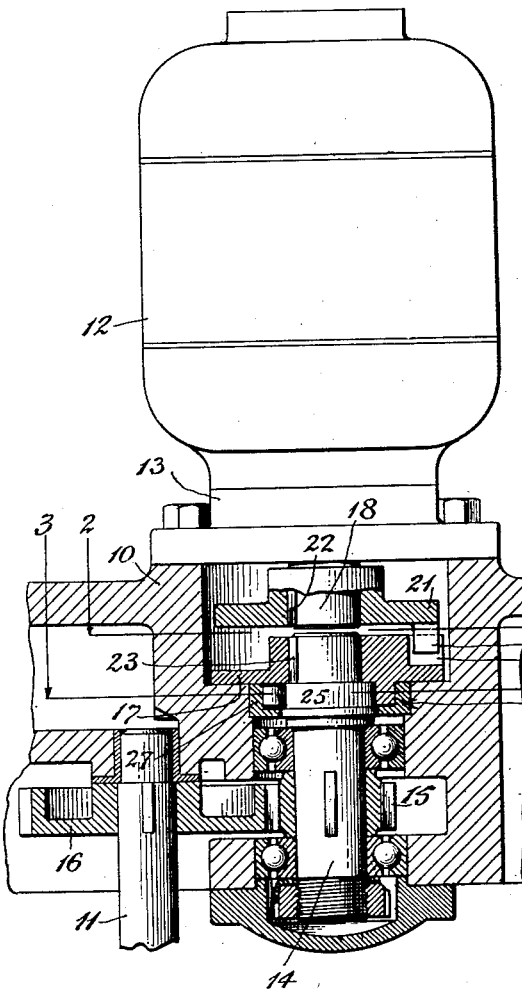
Figure 1 shows in elevation an electric motor, and in section a power transmitting train including a driven shaft and the brake device of the present invention which acts on the driven shaft.

As shown in Fig. 1, the drive of the present invention may be in the form of a transmission device comprising a frame 10 having a suitable bearing for a power output shaft 11. Motor 12 may be mounted on the frame 10 by means of a bracket 13.

Between the power output shaft 11 and the motor there is a transmission shaft 14 for the purpose of obtaining the desired speed reduction, and this transmission shaft has a gear 15 meshing with a gear 16 on the power output shaft 11. The other end of the transmission shaft 14 has a member 17, one of the functions of which is to couple the transmission shaft to armature shaft 18 of the motor 12.

Figure 2:
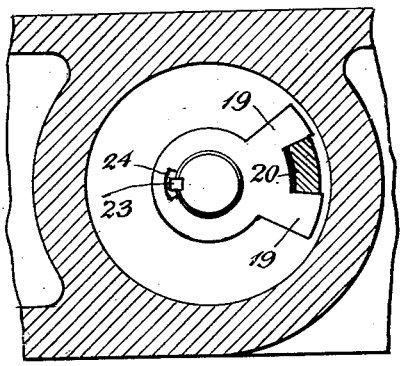
Fig. 2 is a sectional view taken on the line 2—2 of Fig. 1, and showing the coupling between the motor and the drive.

For this purpose, the member 17 has a pair of lugs 19, see Fig. 2, which receive between them a lug 20 on a disk 21 having a key connection 22 with the armature shaft 18. The member 17 also has a key connection 23 between itself and the transmission shaft 14, but as shown in Fig. 2, the key slot 24 is larger than the key 23 so that relative movement between the member 17 and the shaft may exist.

The brake of the present invention is interposed between the frame 10 and a cam member 25 on the transmission shaft 14 which in this case is also the drive shaft. It comprises a hardened cup-like member 26 having its internal wall 27 concentric with the shaft 14. Between the cam member 25 and the wall 27 of the cup-like brake drum 26 there is provided a plurality of rollers 28—29. There may be one pair of rollers 28 and 29 or a plurality of pairs depending upon the loads to be transmitted by the drive and the amount of brake action required to hold the driven shaft.

Normally, the rollers 28 and 29 are pressed away from each other by a spring 30 so that they ride up on opposite inclines 31 on the cam member, and being wedged thereby against the internal wall 27 of the stationary brake member 26 hold the shaft 14 against turning in either direction.

The rollers 28 and 29, which are thus interponents between the moving and stationary parts of the device, are controlled by lugs 32 on the member 17. The lugs, extending on opposite sides of each pair of rollers 28 and 29, are adapted to contact one of said rollers or the other depending upon the direction of movement of the lugs.

Figure 3:
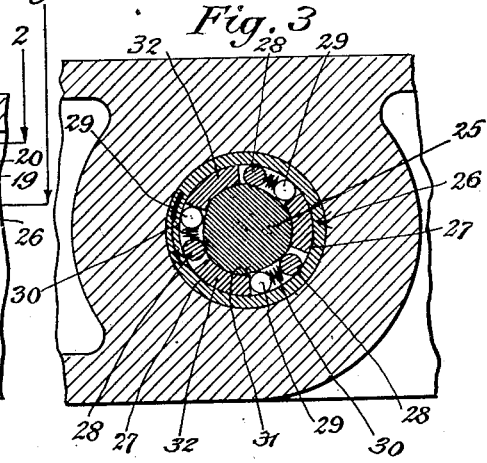
Fig. 3 is a sectional view taken on the line 3—3 of Fig. 1, showing the brake device of the present invention in the position which it occupies when the drive shaft is being driven in the direction of the arrow.

When power is to be transmitted through the drive and electric motor 12 has started, the member 17, by reason of the lost motion connection between the key 23 and the key slot 24, is permitted to move in advance of the transmission shaft 14, and this causes the lug to engage one of the rollers of each pair, the roller 29, when the drive is in the direction of the arrow shown in Fig. 3, and release it from its wedged condition between the cam member 25 and the brake drum 26. When the drive is in this direction, the other roller 28 merely slides down the incline and becomes inoperative.

This releasing of one of the locking rollers is accomplished at about the time that the key 23 reaches the end of the slot 24 so that the continued movement of the member 27 causes the transmission shaft 14 to be driven through the key 23. As soon as the power is removed from the motor 12 or the torque relation between the armature shaft 18 and the transmission shaft 14 otherwise varied so that the torque applied to the member 17 by the motor becomes less than the torque applied thereto by the spring 30 of the brake, the member 17 has retrograde movement relative to the transmission shaft 14 so that the rollers 29 may ride up the incline 31 on the cam 25 and lock the driven shaft 14 against turning, the roller 29 being free to be forced up its incline 31 to lock the shaft against retrograde movement. Since the locking interponents are rollers with smooth surfaces and the cam 25 and race 26 are also smooth, the rollers are effective at all angular positions of the driven shaft. Hence, it will be seen that the brake of the present invention is universal in its use.

This relative retrograde movement between the member 17 and the driven shaft 14 may be produced by forward drifting movement of the driven shaft which will have the effect of permitting the roller 29 to become free of the lug 32 and thus move into locking position. If the load on the power output shaft is great enough to overcome the inertia of the parts as soon as there is a cessation of torque being applied by the motor, then the relative retrograde movement of the member 17, which may be called a coupling member and brake control member combined, will cause it to move backwardly and will carry with it the armature of the motor.

Hence, according to the present invention, it is preferable that the automatically applied and self-releasing brake be placed at the beginning of any reduction drive rather than at the end or some intermediate place.

The brake becoming effective, immediately upon the interruption of the driving power of the motor, and in both directions, power cannot be transmitted to the motor through the drive, nor can the drive be moved by casual application of force to the driven member.

As pointed out above, the drive of the present invention with its automatic brake may be used in many different mechanisms and situations where it is desired to quickly bring a driven shaft to rest and hold it in that position against casual displacement or against external means tending to move it until it is again moved under the power of the motor. Being self-acting both for the application of the brake and its release, the drive of the present invention with the brake may be used at points remote from or inaccessible to the operator.

Variations and modifications may be made within the scope of this invention and portions of the improvements may be used without others.

I claim:

1. A power drive comprising a motor having a drive shaft; a driven shaft to perform work; a power transmitting shaft between the motor drive shaft and the driven shaft; a self-acting brake acting on the transmitting shaft to lock the same comprising a fixed hollow brake drum, a cam member secured to the transmitting shaft, interponents between the interior wall of the brake drum and the cam member, resilient means adapted to wedge the interponents between the said wall of the brake drum and the cam member to stop the transmitting shaft and lock the same against continued turning, the wedging action of the interponents increasing upon increasing torque being applied to the driven shaft; rotatable unlocking means movable relative to the transmitting shaft for moving said interponents against the force of said resilient means to render said interponents inoperative when power is being transmitted therethrough; and means connecting the motor with the transmitting shaft and including means for moving the unlocking means continuously in advance of said transmitting shaft to unlock the latter and maintain it unlocked while power is being transmitted through said drive and allowing retrograde movement of the unlocking means with resulting locking of the transmitting shaft when the torque applied by the motor becomes less than the torque applied by the resilient means.

2. A power drive comprising a reversible electric motor having a drive shaft; a driven shaft to perform work; a power transmitting shaft between the motor drive shaft and the driven shaft; a self-acting locking means acting on the transmitting shaft to lock the same comprising a fixed hollow brake drum, a cam member secured to the transmitting shaft, pairs of opposed interponents between the interior wall of the brake drum and the cam member, resilient means located between the interponents adapted to wedge each interponent between the said wall of the brake drum and the cam member to stop the transmitting shaft regardless of the direction of rotation and lock the same against turning; rotatable unlocking means movable relative to the transmitting shaft for moving one interponent of each pair against the force of said resilient means to render said interponents inoperative according to the direction of rotation of the transmitting shaft, the other interponent of each pair being self-releasing; and means connecting the motor with the transmitting shaft and including means for moving the unlocking means continuously in advance of said transmitting shaft to unlock the latter and maintain it unlocked while power is being transmitted through said drive and allowing retrograde movement of the unlocking means with resulting locking of the transmitting shaft when the torque applied by the motor becomes less than the torque applied by the resilient means, the wedging of the interponents between the cam and wall increasing upon increased torque being applied to the driven shaft by the work.

LOUIS SPRARAGEN.

REFERENCES CITED

The following references are of record in the file of this patent:

UNITED STATES PATENTS

| Number | Name | Date |
|---|---|---|
| 444,102 | Pratt | Jan. 6, 1891 |
| 1,385,785 | Hofer et al. | July 26, 1921 |
| 1,457,694 | Douglas | June 5, 1923 |
| 1,471,398 | Inglis | Oct. 23, 1923 |
| 1,529,248 | Greene et al. | Mar. 10, 1925 |
| 1,715,274 | Blaski | May 28, 1929 |
| 1,824,150 | Howe | Sept. 22, 1931 |
| 2,034,145 | Linde | Mar. 17, 1936 |
| 2,051,400 | Taylor | Aug. 18, 1936 |
| 2,058,589 | Horton | Oct. 27, 1936 |
| 2,172,440 | Edmondson | Sept. 12, 1939 |
| 2,251,466 | Payson | Aug. 5, 1941 |
| 2,258,307 | Vickers | Oct. 7, 1941 |
| 2,310,787 | Hoye | Feb. 9, 1943 |

FOREIGN PATENTS

| Number | Country | Date |
|---|---|---|
| 508,123 | Germany | Sept. 24, 1930 |
| 804,050 | France | July 27, 1936 |